(12) United States Patent
Zheng et al.

(10) Patent No.: US 7,952,062 B2
(45) Date of Patent: May 31, 2011

(54) DYNAMICALLY CONFIGURABLE MULTIPLE WAVELENGTH PHOTODETECTOR ARRAY FOR OPTICAL STORAGE APPLICATIONS

(75) Inventors: Dong Zheng, San Jose, CA (US); Daryl Chamberlin, San Jose, CA (US); Hung Chou, Fremont, CA (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 12/687,084

(22) Filed: Jan. 13, 2010

(65) Prior Publication Data

US 2010/0177625 A1    Jul. 15, 2010

Related U.S. Application Data

(63) Continuation of application No. 11/748,237, filed on May 14, 2007, now Pat. No. 7,663,087.

(60) Provisional application No. 60/891,806, filed on Feb. 27, 2007.

(51) Int. Cl.
*G11B 7/00* (2006.01)
*G01J 1/44* (2006.01)

(52) U.S. Cl. .................. 250/214 R; 359/15; 369/103

(58) Field of Classification Search ............... 250/214 R, 250/216; 359/15; 369/44.37, 103, 116
See application file for complete search history.

(56) References Cited

U.S. PATENT DOCUMENTS

| | | | |
|---|---|---|---|
| 5,335,213 A | 8/1994 | Fukumoto et al. | |
| 6,512,608 B2 | 1/2003 | Ohyama | |
| 7,317,674 B2 | 1/2008 | Rees et al. | |
| 7,485,486 B2 | 2/2009 | Zheng et al. | |
| 2004/0170093 A1* | 9/2004 | Kamiya | 369/44.25 |

* cited by examiner

*Primary Examiner* — Seung C Sohn
(74) *Attorney, Agent, or Firm* — Fliesler Meyer LLP

(57) ABSTRACT

A photodetector integrated circuit (PDIC) capable of being used with at least two different types of optical discs includes a photodetector (PD) array and a switch matrix. The PD array includes a center channel PD and a side channel PD electrically isolated from the center channel PD. The switch matrix, which includes a plurality of inputs and a plurality of outputs, can be selectively configured in a plurality of different switch configurations. The side channel PD includes a plurality of electrically isolated PD sections. Each electrically isolated PD section of the side channel PD is adapted to detect light and provide an electrical output signal, indicative of the light detected by the PD section, to a different one of the inputs of the switch matrix. The switch matrix is adapted to combine the electrical output signals provided by the electrically isolated PD sections of the side channel PD in a plurality of different manners, in dependence on which of the plurality of different switch configurations is selected.

19 Claims, 8 Drawing Sheets

US 7,952,062 B2

DYNAMICALLY CONFIGURABLE MULTIPLE WAVELENGTH PHOTODETECTOR ARRAY FOR OPTICAL STORAGE APPLICATIONS

PRIORITY CLAIM

This application is a continuation of U.S. patent application Ser. No. 11/748,237, entitled DYNAMICALLY CONFIGURABLE MULTIPLE WAVELENGTH PHOTO-DETECTOR ARRAY FOR OPTICAL STORAGE APPLICATIONS, filed May 14, 2007, which claims priority to U.S. Provisional Patent Application No. 60/891,806 entitled DYNAMICALLY CONFIGURABLE MULTIPLE WAVELENGTH PDIC, filed on Feb. 27, 2007, both of which are incorporated by reference in their entirety into the present application.

FIELD OF THE INVENTION

The invention relates to photodetector arrays, more specifically to dynamically programmable photodetector arrays that can be used in optical storage applications including power monitor integrated circuits (PMICs) or photodetector integrated circuits (PDICs) used in optical pick-up units, such as for optical disc drive apparatus.

BACKGROUND

A configuration and operation of a conventional optical pick-up apparatus 100 will first be described below, with reference to FIG. 1. This apparatus 100 enables information to be recorded, reproduced and erased with respect to a CD group disc 110 (e.g. CD, CD-ROM, CD-R and CD-RW) and a DVD group disc 111 (e.g. DVD, DVD-ROM, DVD-RAM, DVD-R and DVD-RW, DVD+R, DVD+RW), as well as to write/read more recently introduced Blu-ray discs and/or HD-DVD format discs, with single or multiple layer formats.

Although FIG. 1 shows both of the CD group disc 110 and the DVD group disc 111 for the purpose of illustration, as a practical matter, only one of these discs is loaded thereon at any given time. The CD group disc 110 or the DVD group disc 111 is placed on a common plane P facing an objective lens 109. On the reverse side of the plane P, recording surfaces 110a and 111a are provided. Since the CD group disc 110 has a thickness larger than that of the DVD group disc 111, the recording surface 110a of the CD group disc 110 is positioned further from the objective lens 109 than the recording surface 111a of the DVD group disc 111.

This apparatus 100 has an infrared semiconductor laser device 101 for CD (about 780 nm) and a red semiconductor laser device 102 for DVD (about 650 nm) and/or a blue laser device for Blu-ray/HD-DVD (about 405 nm) which can also be present, but is not shown in FIG. 1. In optical paths between the laser devices 101 and 102 and the discs 110 and 111, 3-beam generating diffraction gratings 103 and 104, a beam splitter 105, a collimator lens 106, a beam splitter 107, a condenser lens 112, a photodetector IC (PDIC) 113, a mirror 108 and the objective lens 109 are arranged (Lens 109 should be rotated counter clockwise by 180 degrees from the position as shown in FIG. 1). PDIC generally has a fixed photo detector pattern.

Part of the laser beam from the laser devices 101 and 102 is incident on a laser power monitoring photodetector (PMIC) 121. The photoelectrically converted output of the photodetector 121 is supplied to an automatic power controller 122 which is coupled to a laser driver 123 which drives laser devices 101 and 102.

The 3-beam generating diffraction gratings 103 and 104 form three beams from optical beams emitted from the infrared semiconductor laser device 101 and the red or blue semiconductor laser device 102, respectively. The beam splitter 105 guides the beams that have passed through the 3-beam generating diffraction gratings 103 and 104 onto the common optical axis. The collimator lens 106, the objective lens 109 and the condenser lens 112 function as a light-gathering device. The beam splitter 107 divides the reflected light from the disc 110 or 111.

The optical pick-up apparatus operates as follows: when recording, reproducing or erasing information with respect to the CD group disc 110, the infrared semiconductor laser device 101 operates. An optical beam emitted from the infrared semiconductor laser device 101, which is indicated by a solid line, is diffracted by the 3-beam generating diffraction grating 103 so as to be divided into three optical beams (a main beam as zero-order diffracted light and side beams as .+-.first-order diffracted light). These three optical beams pass through the beam splitter 105, then are converted from the divergent beams to parallel beams by the collimator lens 106, and enter into the objective lens 109 via the mirror 108 to be focused onto the CD group disc 110. Reflected light from the CD group disc 110 passes through the objective lens 109 and the mirror 108, is directed to a different direction by the beam splitter 107, and is focused onto the PDIC 113 by the condenser lens 112. From the main beam and side beams incident on the PDIC 113, an RF signal, a focus error signal and a tracking error signal are detected.

Meanwhile, when recording, reproducing or erasing information with respect to the DVD group disc 111, the red semiconductor laser device 102 operates. An optical beam emitted from the red semiconductor laser device 102, which is indicated by a dashed line, is diffracted by the 3-beam generating diffraction grating 104 so as to be divided into three optical beams (a main beam as zero-order diffracted light and side beams as .+-.first-order diffracted light). These three optical beams are directed to a different direction by the beam splitter 105, then are converted from the divergent beams to parallel beams by the collimator lens 106, and enter into the objective lens 109 via the mirror 108 to be focused onto the DVD group disc 111. Reflected light from the DVD group disc 111 passes through the objective lens 109 and the mirror 108, is directed to a different direction by the beam splitter 107, and is focused onto the PDIC 113 by the condenser lens 112. From the main beam and side beams incident on the PDIC 113, an RF signal, a focus error signal and a tracking error signal are detected. For blue medium, more photo-detector sections may be required to calibrate scattered light and for other purposes.

As described above, optical pickup apparatus 100 uses a single PDIC 113 is for optical signal reading for both DVD and CD, and with addition of a blue laser (not shown) can also provide optical signal reading for blu-ray and HD-DVD. As noted above, in typical applications, each laser beam, such as infrared (780 nm for CD), red (about 650 nm for DVD and blue (405 nm for Blu-ray and HD-DVD) is split to 3 beams by optical gratings, forming a central beam (zero order) and two side beams (first order). The center beam reads the disc data, while the side beams helps to keep the beam in the disc track.

FIG. 2(a) shows a conventional PDIC 200 having main channel PD (or PD bank) 210 and side channels PD (or PD banks) 220 and 230 along with a single diffraction grating 231. The single grating 231 is shown only to demonstrate a limitation of conventional optical pickup units. In practical applications, each laser will generally have its own diffraction grating, but a single PDIC, such as PDIC 200, will be used.

PD or PD main channel bank 210 detects the zero order beam, and side channel PD or PD bank 220 and side channel PD or PD bank 230 each detect one of the pair of first order diffracted beams. As well known in then art, when light passes through a diffraction grating, such as grating 231, different wavelengths of light are bent through a different angle, with the longest wavelength (780 nm-infrared) being bent through the largest angle while blue light (405 nm) is bent through the smallest angle, with red light falling in between. Thus, due to different wavelength for CD (780 nm), DVD (650 nm) and blue ray and HD-DVD (405 nm), even though the central beam lands at the center of the main channel photo detector 210 for each laser beam, the side beams generally land at different locations on side channel PD or PD bank 220 and side channel PD or PD bank 230 due to the wavelength difference. As shown in FIG. 2(a), since the red beam lands at the center of side channel PD or PD bank 220 and side channel PD or PD bank 230, PDIC 200 will be optimized for DVD (about 650 nm), but will provide relatively poor performance for both CD (780 nm) and blue ray and HD-DVD (405 nm).

FIG. 2(b) shows a conventional PDIC pattern layout showing PD or PD center bank 210, side channel PD or PD bank 220, and side channel PD or PD bank 230. Center (main) PD bank 210 is shown comprising sectors A, B, C and D.

For optimal performance, the side beam should land at the center of the 2 sections of the side PD pattern (i.e., between H&G for PD 220 and between F&E for PD 230). However, as shown in FIG. 2(a) for different wavelengths, the location of the side channel PDs would need to be different for the various wavelengths for the respective side beams to land at the center of the 2 sections of the side PD pattern. However, since conventional photodetector detection patterns are fixed, the PDIC 200 can only be optimized for one wavelength, such as DVD (about 650 nm) shown in FIG. 2(a), while providing relatively poor performance for the other wavelengths, such as for both CD (780 nm) and Blu-ray and HD-DVD (405 nm).

SUMMARY

A dynamically configurable multiple wavelength adapted photodetector (PD) integrated circuit comprises a PD array comprising a center bank of electrically isolated PD sections, and a first and a second side channel bank of electrically isolated PD sections on opposing sides of the center PD bank, the sections for receiving light (e.g. laser light) and outputting electrical signals. Although the invention is described as having one side channel bank per side, the invention can also be embodied using more than one side channel. A dynamically configurable switching matrix having a first plurality of inputs is coupled to outputs of the PD sections and a second plurality of inputs is provided for receiving control signals which select from a plurality of different switch configurations. The switch configurations set which of the PD sections are coupled to particular ones of a plurality of matrix outputs provided by the switching matrix, thus providing a dynamically reconfigurable photodetector pattern. As used herein, "active PD sections" refer to PD sections which are coupled by the switching matrix to provide electrical signals for processing by the system.

A data transfer controller (e.g., 340 in FIG. 3) having a serial interface is coupled to the second plurality of inputs of the switching matrix for setting specific ones of the plurality of different switch configurations, or a mode decoder (e.g., 340 in FIG. 3) can be used to decode into one of the plurality of different switch configurations, such as a configuration associated with CD, DVD or Blu-ray. An output block comprising a plurality of amplifiers is coupled to the plurality of matrix outputs for providing a plurality of amplified outputs, wherein dynamically adjustable combinations of electrical signals from the PD sections are directed to the plurality of amplifiers based on the switch configuration. The dynamically reconfigurable photodetector pattern provided by the present invention is operable for effectively centering a location of an incident side beam at a center of the side channel PD banks independent of a wavelength (and resulting position) of the beam.

In the embodiment where the structure providing switching matrix configuration information comprises a data transfer controller having a serial interface, the data transfer controller implements can implement I2C, or other serial interface formats. In one embodiment, the switching matrix comprises a plurality of PMOS FETs.

In another embodiment, the PD sections comprise photodiodes having edge contacting structures, the edge contacting structures being coupled to the first plurality of inputs of the switching matrix. In this embodiment, the PD sections can include an anti-reflective coating (ARC), wherein the ARC is exposed to an ambient except at regions comprising the edge contacting structures.

In an embodiment particularly well suited in PMIC circuits, the side PD banks can comprise a plurality of concentric PD segments. In this embodiment, a center PD of the plurality of concentric segments can have a substantially circular shape.

The output amplifiers can include gain/bandwidth adjust circuitry, offset adjust circuitry, or both. This embodiment permits external adjustment of dc and ac parameters of the output amplifiers.

A method for dynamically configuring a photodetector (PD) integrated circuit for improved multiple wavelength operation, comprises the steps of providing a PD array comprising a center bank of electrically isolated PD sections, and a first and a second side channel bank of electrically isolated PD sections on opposing sides of the center PD bank, wherein the PD sections receive light and output electrical signals. Responsive to light received, electrical signals are received from a first configuration of active ones of the PD sections including PD sections from the center bank, the first bank and the second bank. The first configuration is then dynamically modified to provide a second configuration of active PD sections having different active PD sections in the first and said second bank as compared to the first configuration to provide a different photodetection pattern and electrical signals from the active PD sections comprising the second configuration are received. The second configuration is generally operable to center a location of an incident optical side beam for both the first and second (side) banks. The dynamic modifying step can be based on an externally applied signal. In another embodiment, the dynamic modifying step can comprise an automatic configuration. The automatic configuration can comprise the steps of inserted a media into an optical drive, wherein said optical drive detects and determines a media type, determining a type of the media, and implementing a predetermined configuration from a plurality of available configurations, the predetermined configuration being optimized for the media type that is determined. The media type can be CD, DVD, Blu-ray or HD-DVD. In one embodiment, the implementing comprises utilizing a controller together with firmware residing in the optical drive, or a built in function in the controller.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of".

A dynamically configurable multiple wavelength adapted photodetector (PD) integrated circuit, comprises a PD array comprising a center bank of electrically isolated PD sections, and a first and a second side channel bank of electrically isolated PD sections on opposing sides of the center PD bank, the sections for receiving light and outputting electrical signals. A dynamically configurable switching matrix having a first plurality of inputs is coupled to outputs of the PD sections and a second plurality of inputs is provided for receiving control signals which select from a plurality of different switch configurations, wherein the switch configuration sets which of the PD sections are coupled to particular ones of the plurality of matrix outputs provided by the switching matrix. A structure providing switching matrix configuration information is coupled to the second plurality of inputs of the switching matrix to selects specific ones from the plurality of different switch configurations.

In one embodiment, the structure providing switching matrix configuration information comprises a data transfer controller having a serial interface. In another embodiment, a mode decoder (e.g., 340 in FIG. 3) can be used to decode into one of the plurality of different switch configurations, such as a configuration associated with CD, DVD or blue. For example, a user can enter the matrix information via the serial interface or the mode decoder.

An output block comprising a plurality of amplifiers is coupled to the plurality of switching matrix outputs for providing a plurality of amplified outputs, wherein dynamically adjustable combinations of the electrical signals from the PD sections are directed to the plurality of amplifiers based on the switch configuration. As described below, by selecting a proper switch configuration, dynamically configurable multiple wavelength PDICs according to the present invention can effectively center the location of the side beam at the center of the respective side channel banks, independent of the wavelength of the light beam.

Figure 3:
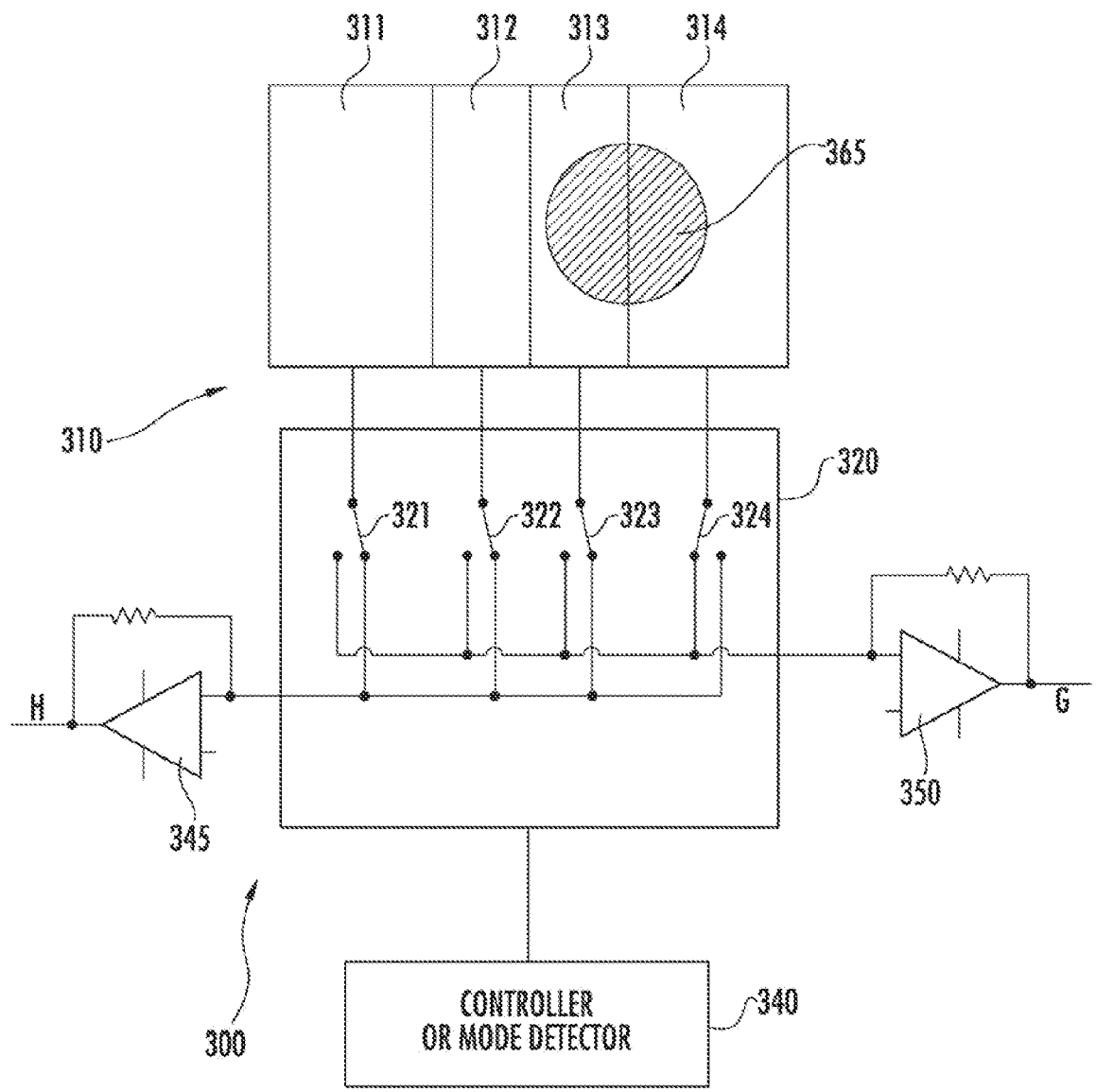
FIG. 3 shows a portion of a simplified dynamically configurable multiple wavelength PDIC according to the present invention showing an exemplary side channel PD 310 comprising banks 311-314 along with related circuitry.

FIG. 3 shows a portion of a simplified dynamically configurable multiple wavelength PDIC 300 according to the present invention showing an exemplary side channel PD 310 comprising sections 311-314 along with related circuitry. Beam spot 365 is shown offset to the center of side channel PDIC 310 being incident on its right hand side sections, sections 313 and 314. For a typical application side channel PDs according to the invention, such as 310 would generally be placed on both sides of a main channel PD.

Related circuitry includes switching matrix 320 comprises switches 321, 322, 323 and 324 is coupled to the outputs of each of the respective PD sections 311-314. Switching matrix 320 is preferably implemented using PMOS FETs. PMOS are preferably used because switching is generally at a high bias voltage, such as around 3 volts. However, NMOS FETs can be used, bipolar FETs of either type, or a BiMOS arrangement may be used. Switching matrix 320 allows the switch position to be configured through a serial interface, such as implementing I2C. Dynamically configurable multiple wavelength PDICs according to the present invention can be either be programmed through I2C, or it can read configuration data from EEPROM through I2C. The serial interface used however is not limited to I2C, since it can be any interface that allows external programming of the device.

Configuration can be external or be automatic. In one embodiment, automatic configuration is realized as follows. The optical drive detects the media once a media is inserted. Once the type of media is determined as being, for example, CD, DVD, Blu-Ray, or HD-DVD, the controller configures appropriate PD pattern for the type of media present through a serial interface. The automatic PD configuration feature can be done by firmware in a optical drive or a built in function in controller. In another embodiment, configuration can be implemented by decoding of a pin selection, such as decoding of CD/DVD/Blue pin selection. The matrix outputs of the switching matrix 320 are coupled to output amplifiers 345 and 350 (or more generally collectively "output block"), with amplifier 345 for receiving signals from banks 311-313 and amplifier 350 receiving a signal from bank 314. Each PD section 311-314 switches to one and only one output of the output block, and multiple PD sections can be switched to the same output of output block.

Figure 1:
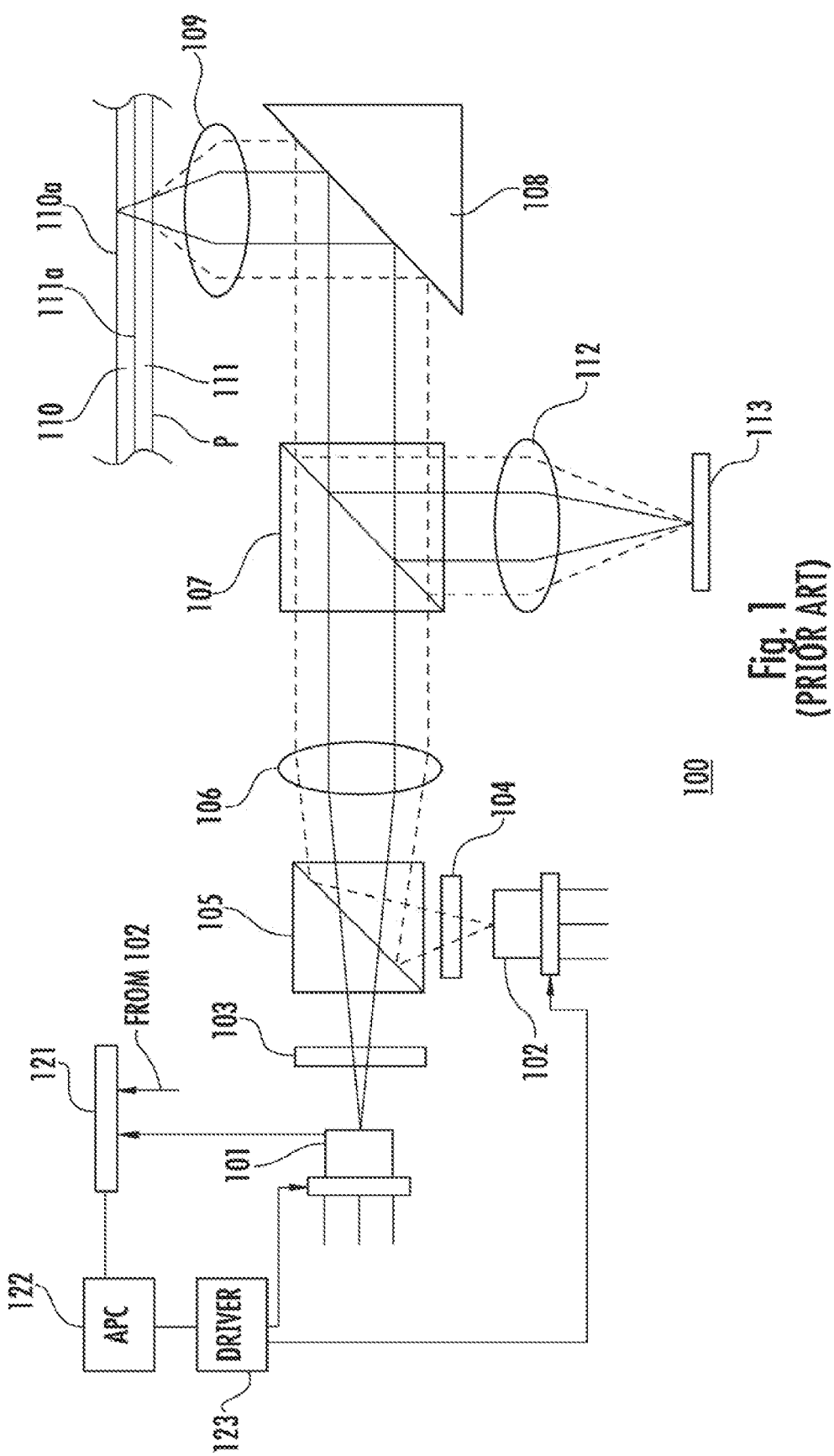
FIG. 1 shows an optical system for a conventional optical pick-up apparatus.
Figure 2A:
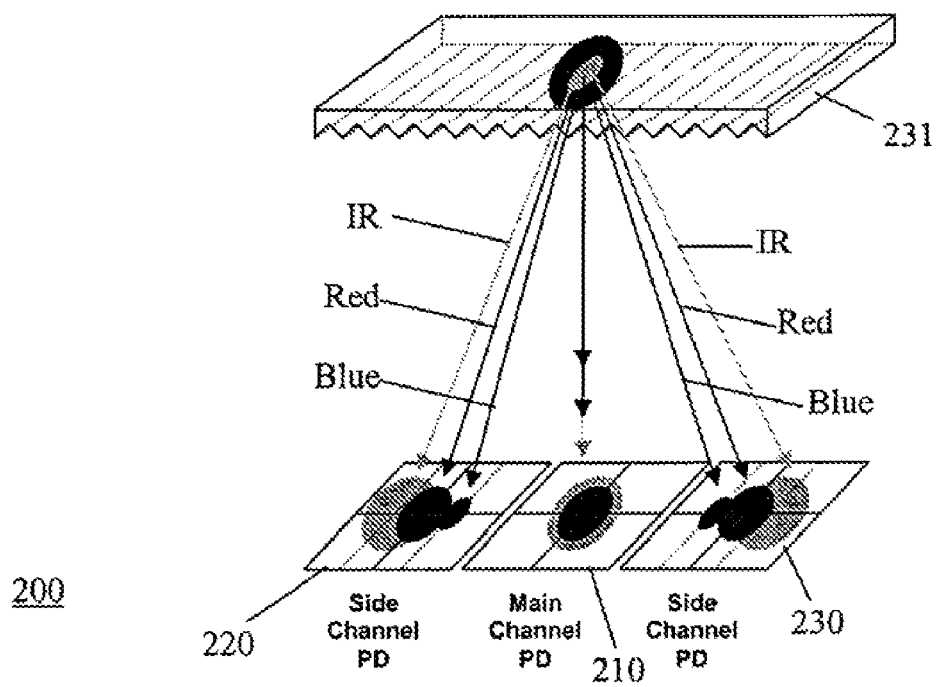
FIG. 2(a) shows a conventional PDIC 200 having main channel PD (or PD bank) 210 and side channels PD (or PD banks) 220 and 230 along with a single grating 231.
Figure 2B:
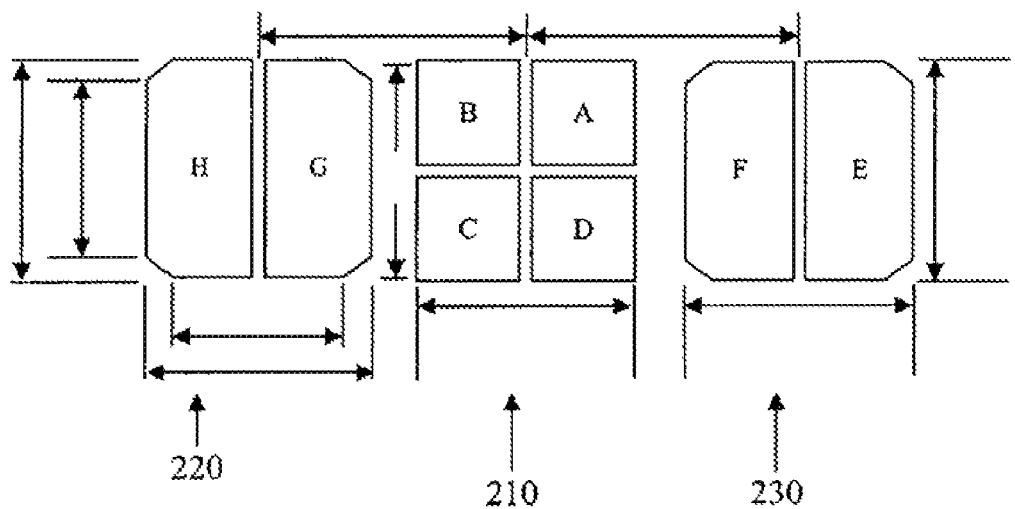
FIG. 2(b) shows a conventional PDIC pattern layout showing PD or PD bank 210, side channel PD or PD bank 220, and side channel PD or PD bank 230.

Thus, the PD pattern HG shown in FIG. 2(b) is split into 4 sections 311-314. For the exemplary beam spot 365 shown in FIG. 3, the 3 sections of the PD pattern on the left hand side 311-313 are all combined by the switch orientation and are coupled to amplifier 345 shown in FIG. 3 and effectively become PD sector H shown in FIG. 2(b), while the single section on the right hand side 314 is coupled to amplifier 350 to effectively become PD sector G shown in FIG. 2(b). As a result, the beam spot 365 becomes well centered at the interface between combined sections 311-313 and section 314.

Figure 4:
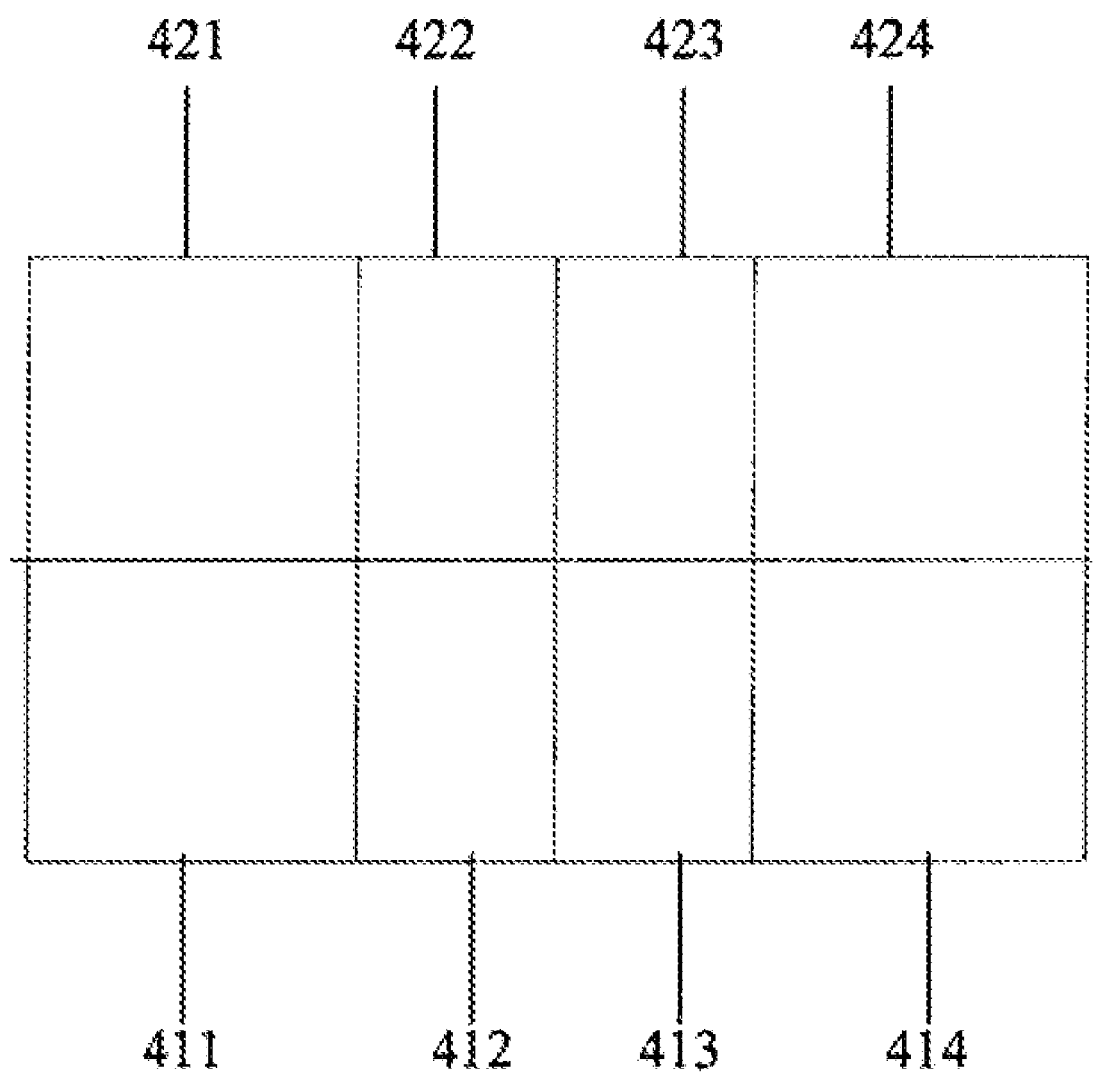
FIG. 4 shows a side beam PD pattern split both vertically and horizontally into a 2D array of PD sections. Through appropriate connections, a diagonal pickup pattern can be implemented. In this case, the switching matrix (not shown) would be implemented as a 2D matrix.

In some optical applications, it may be desirable for the side beam PD pattern to be further split horizontally, vertically, or diagonally. FIG. 4 shows a side beam PD pattern split both vertically and horizontally into a 2D array of PD sections 411-414 and 421-424. In this case, the switching matrix (not shown) would be implemented as a 2D matrix. Through appropriate connections, a diagonal pickup pattern can be implemented. In the case the light beam is formed in diagonal, either detectors 412-423, 413-422, (413+414)-(421+422), or (411+412)-(423−424) pairs can be wired through a switching matrix as described above to detect tracking error signals from side beams.

In a preferred embodiment, the electrical connection to the PD sections comes from the sides (perimeter) of the respective PDs. This arrangement allows use an PD having substantially improved wavelength invariant performance ("triple wavelength PD") described in commonly assigned published U.S. Application No. 20070072326 entitled "PHOTODIODE FOR MULTIPLE WAVELENGTH OPERATION" to Dong et al. which involves an anti-reflection deep trench process which includes etching out all metal connections on top of the PD. Published U.S. Application No. 20070072326 to Dong. et al. is hereby incorporated by reference in its entirety into the present application.

Dong et al. discloses a method of a fabricating a multiple wavelength adapted anti-reflection layer coated (ARC) P+N or N+P photodiodes (generally being a PIN or NIP structure, with "I" indicating the intrinsic layer), and resulting photodiodes. The method disclosed comprises the steps of providing a substrate having a first semiconductor type surface region on at least a portion thereof, implanting and forming a second semiconductor type shallow surface layer into the surface region, and forming a multi-layer ARC on the shallow surface layer. The forming step includes depositing or forming a thin oxide layer on the shallow surface layer and depositing a second dielectric layer different from the thin oxide layer on the thin oxide layer. An etch stop is formed on the second dielectric, wherein the etch stop includes at least one layer resistant to oxide etch. At least one oxide including layer (e.g. ILD) is then deposited on the etch stop. The oxide including layer and etch stop are then removed to expose at least a portion of the ARC to the ambient. As noted above, the ARC to the environment arrangement of the disclosed PDs also involves etching out all metal connections on top of the PD.

Figure 6:
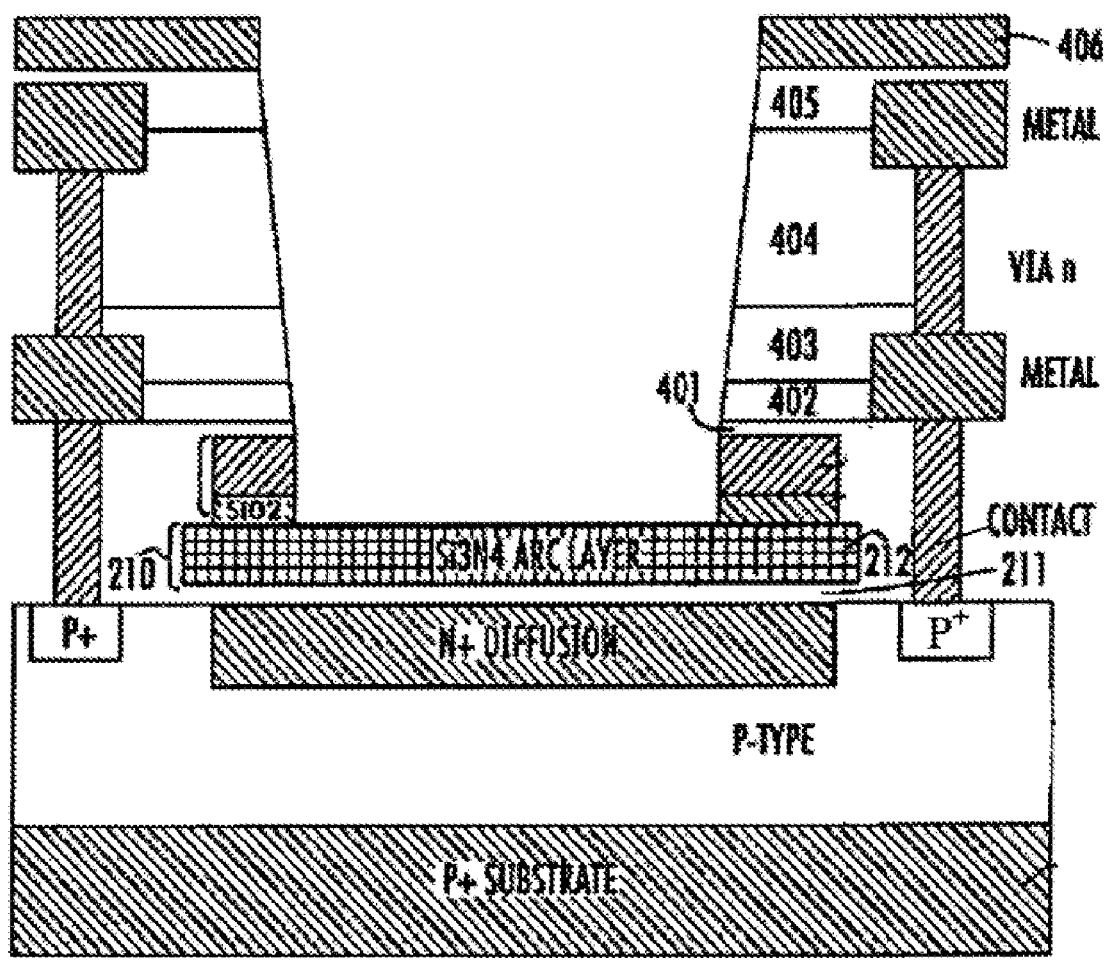
FIG. 6 shows a cross sectional schematic of an in-process PD structure following etch of the upper etch stop layer, such as silicon nitride or polysilicon, followed by silicon dioxide etch, typically a wet etch, followed by resist removal as disclosed in published related U.S. Application No. 20070072326 entitled "PHOTODIODE FOR MULTIPLE WAVELENGTH OPERATION" to Dong et al. The antireflective coating (ARC) layer is seen to be open to the ambient except at its periphery. The dynamically configured PDIC/PMIC pattern generally has at least one side of each PD segment at the periphery of the ARC layer so that it has an electrical path to the circuitry.

FIG. 6 shows the photodiode resulting structure following etch of the upper etch stop layer, such as silicon nitride or polysilicon, followed by silicon dioxide etch, typically a wet etch, followed by resist removal. The ARC layer comprising silicon nitride layer 212 on thin oxide layer 211 is seen to be open to the ambient except at its periphery. The thin oxide layer (e.g. 1.5 to 8 nm) disposed between the ARC nitride layer 212 (or other second dielectric) and the Si surface of the photodiode is used to reduce tension/stress between the Si and the silicon nitride 212 or other second dielectric. On the periphery of the PD are the ILD layers 401-405, and the metal/via/metal/contact stack which contacts the heavily doped (P+) contact region at the edge of the PD. Layer 406 is the passivation, which is also removed from the active PD surface area from the periphery so that the antireflective coating (ARC) layer is open to the ambient except at its periphery.

A variation of Dong et al. that complies with the disclosed anti-reflection deep trench process, is a non-edge contact PD cell formed by extending the PD cell region (corresponding to the N+ diffusion shown) to the edge of the PD by a thin stripe of PD implant, effectively shaping the non-edge contact PD cell to an edge-contact PD cell. In this variant, any other routing material will be etched out during the process.

Generally, the number of individual PD segments should be minimized to reduce fringe parasitic capacitance from the PD segments so that the speed of the PDs is not significantly reduced. Referring again to FIG. 2, to accommodate PDs disclosed in Dong et al., which require etching out the metal connections and other layers on top of the ARC, the respective PD segments can be connected to the associated circuitry through their perimeters, therefore no metal connection is necessary in the middle of PD opening to be compatible with the process and PDs disclosed in Dong et al.

Figure 5:
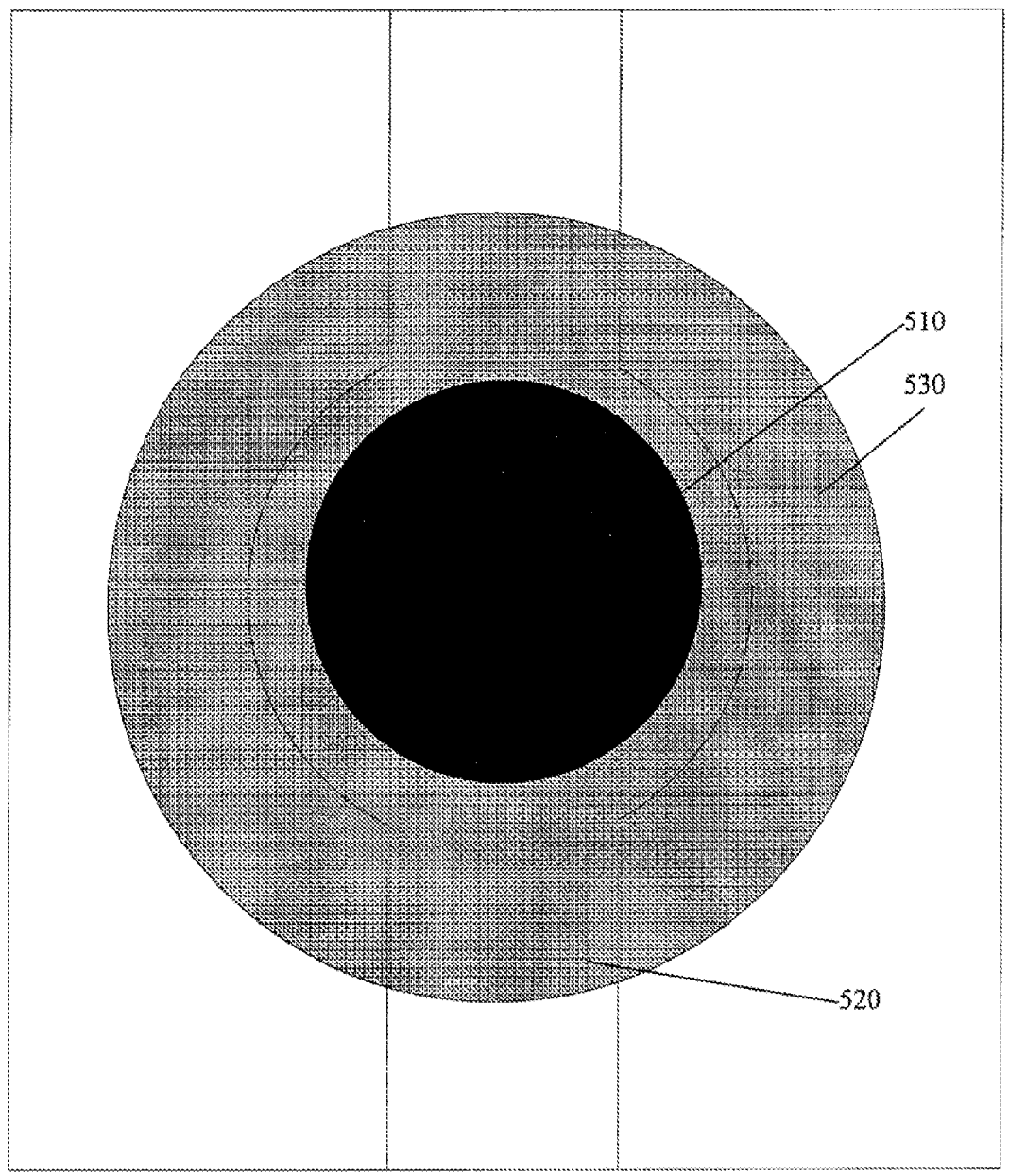
FIG. 5 shows a PD according to an embodiment of the present invention divided into 3 segments for PMIC applications. In PMIC applications, an optimal PD size is generally slightly more than the beam spotsize, so that it can receive effectively all the light, without being too big resulting extra parasitic capacitance. For large beam spotsize, the 3 segments are combined to a single segment. For smaller beam size, only the center segment is rendered functional to reduce the capacitance.

The PD layout can be optimized for certain applications. In applications such as PMIC, since the spotsize and position at different wavelength may be different, it is generally desirable to reduce the PD size when the beam spotsize is small to reduce the capacitance of the PD, such as to increase speed. In FIG. 5, the PD 500 is shown divided into 3 co-centric segments 510, 520, and 530. Dielectric isolation between segments 510, 520 and 530 is provided, but is not shown in FIG. 5. For large beam spotsize, such as above a predetermined spotsize, the 3 segments are preferably combined into effectively a single segment, such by as closing all respective switches associated with segments 510, 520 and 530 analogous to the arrangement described in FIG. 3 using switching matrix 320. For smaller beam sizes, such as below a certain predetermined size, only the center segment 510 is made functional to reduce capacitance. In the arrangement shown, the center segment 510 has a circular contour similar to Gaussian-like beam shape, so that the PD signal still comes from the perimeter of the central segment. This allows use of PDs complying with the process and architecture disclosed in Dong et al. Besides the co-centric segment PD configuration in FIG. 5 for PMIC applications, PDs for PMIC applications according to the present invention can be also configured as described relative to FIG. 4 (as horizontal vertical or diagonal) using the scheme described relative to FIG. 5.

Figure 7:
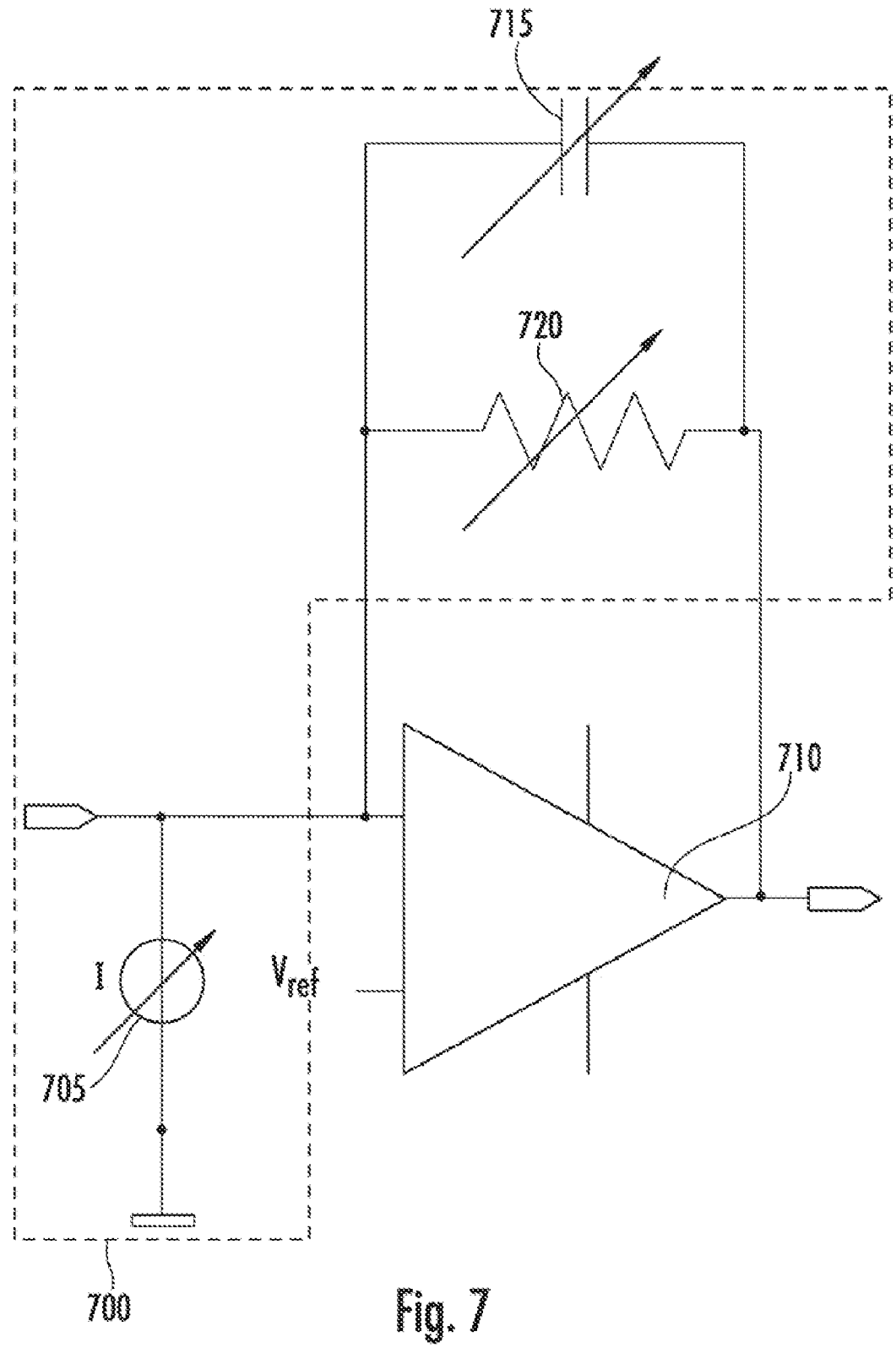
FIG. 7 shows a simplified exemplary circuit arrangement which permits external adjustment of the offset using the variable current source shown, and gain and bandwidth of the output amplifiers using the variable feedback network shown comprising a variable capacitor and resistor.

The amplifier gain, bandwidth and offset for amplifiers in the output block, such as amplifiers 345 and 350 shown in FIG. 3, can be externally adjusted. FIG. 7 shows a simplified exemplary an circuit arrangement 710 which permits external adjustment of dc and ac parameters of amplifier 710. Offset adjustment is accomplished using variable current source 705, while gain and bandwidth of the output amplifiers can be modified, for example, using the variable feedback RC network shown comprising a variable capacitor 715 and variable resistor 720. As known in the art, externally applied digital inputs (not shown) can be used to set the current source level, as well as the feedback resistor and capacitor values.

Figure 8:
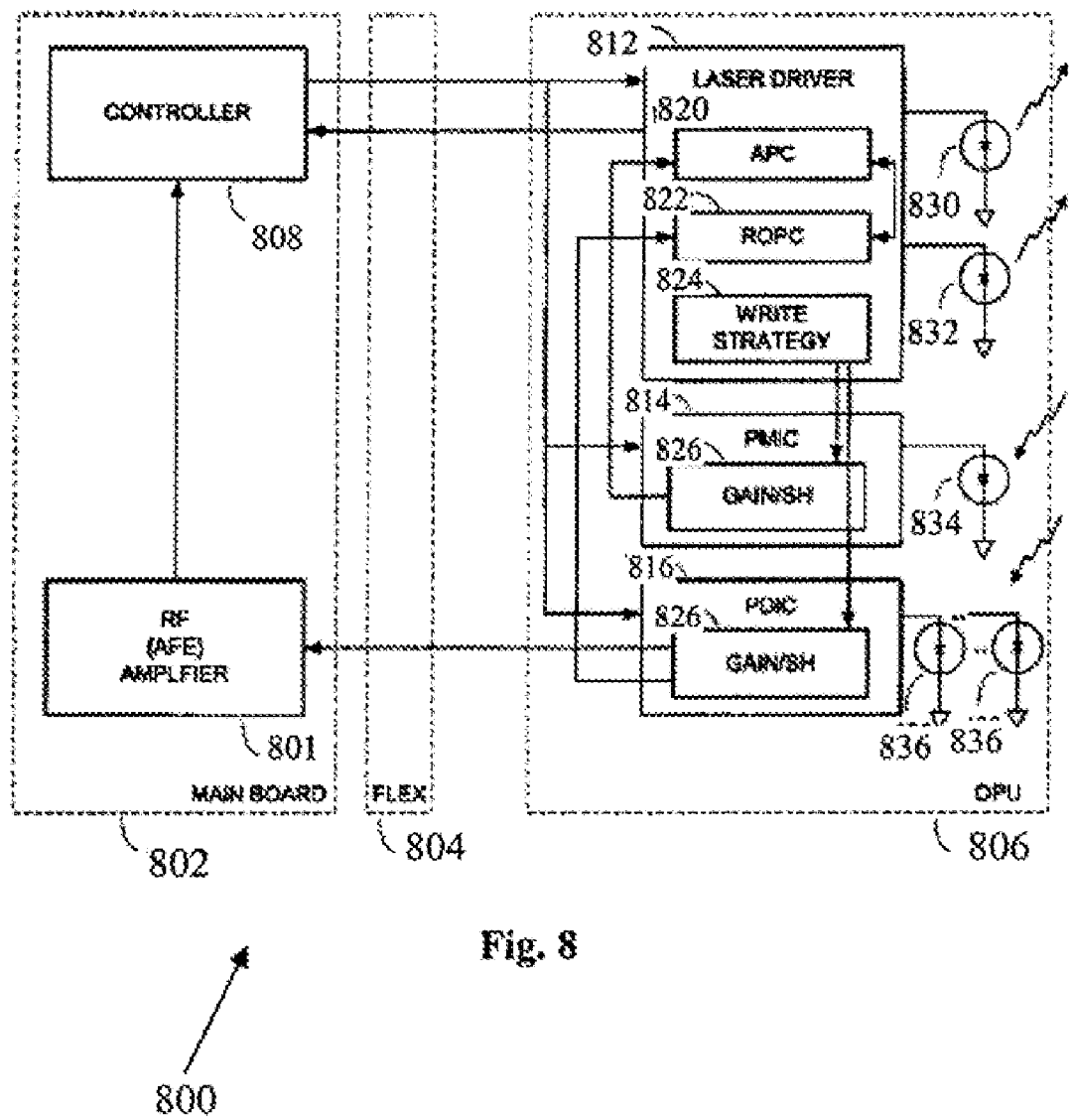
FIG. 8 is a schematic of an exemplary optical pickup unit (OPU) including both a power monitor integrated circuit (PMIC) and a photo-detector integrated circuit (PDIC) according to the present invention along with a laser driver.

FIG. 8 shows portions of an information recording/reproducing apparatus 800, including a main circuit board 802, a flex cable 804 and an optical pick-up unit (OPU) 806 according to an embodiment of the present invention. The description below of apparatus 800 is based on commonly assigned U.S. Publication No. 20040202072 to Rees et al. The main board 802 includes a controller 808 and an analog front end (AFE) 810. The OPU 806 includes a laser driver integrated chip (LDIC) 812, a power monitor integrated chip (PMIC) 814 and a photo-detector integrated chip (PDIC) 816.

The LDIC 812 controls the current to laser diodes 830 and 832, causing one of the laser diodes 830 or 832 to output a light signal that, after being appropriately focused by an optical system (not shown), is incident on an a optical media disk (not shown). The magnitude of the current provided by the LDIC 812 (which controls the output power of the laser diode 830 or 832) can vary depending on whether the laser diode is being used to read data from or write data to the media. Further, the magnitude of the current may also depend on specific disc media, DVD or CD standards, and/or the speed at which data is being read or written.

Conventionally, power control is performed at the main board, requiring high bandwidth monitoring and information signals to be sent from an optical pick-up unit up the flex to the main board before power control processing can take place. While being sent up the flex, these signals are subject to corruption. In the preferred embodiment shown, the LDIC 812 includes an automatic power control (APC) portion 820, a running optical power control (ROPC) portion 822 and a write strategy generator 824.

The LDIC 812 is shown as being capable of driving two different laser diodes 830 and 832. For example, one of the laser diodes outputs a wavelength of about 780 nm, which used in CD technology, and the other laser diode outputs a wavelength of about 655 nm, which is used in DVD technology. A third laser diode operating at about 405 nm for Blu-ray is not shown. Accordingly, LDIC 812 can be used in CD and/or DVD and Blu-ray type devices. Of course, a single laser diode can be used, if the LDIC is only going to be used with one type of technology. The LDIC 812 can also be possible of driving more than two laser diodes. For example, the LDIC 812 can be capable of driving a first laser diode that outputs a wavelength of 780 nm, a second laser diode that outputs a wavelength of 655 nm, and a third laser diode that outputs a wavelength of 405 nm. Of course, the laser diodes can output light signals of other wavelengths.

The write strategy generator 824 implements an appropriate write strategy, which may depend, for example, on the media, DVD or CD standards, and/or speed being supported. The ROPC 822 uses (e.g., modulates) the APC signals to compensate for variations in the optical media. The APC 820 controls the laser diode to compensate for changes in the laser diode's characteristics. These portions are discussed in more detail below.

A photo-detector 834 detects optical signals output by laser diode 830 or 832 before the light signals reach the media, and provides a signal representative of the detected intensity to the PMIC 814. In contrast, multiple photo-detectors 836 detect the optical signal that has been reflected from the media (e.g., DVD, CD or Blu-ray media). An information signal produced by photo-detectors 836 includes user data (e.g., to be provided to a host in response to a read request from the host), servo information (e.g., used for servo control) and amplitude information. Samples of the amplitude of the information signal produced by the PDIC 816 are provided to the ROPC 822, which adjusts the power signal and current signal in the APC to compensate for variations in the media, as discussed below. Samples of the signal produced by the photo-detector 834, in contrast, are used by the APC 820, such as to compensate for environmental variations and aging of the laser diodes 830 and 832.

Conventionally, the sample-and-hold and loop compensation circuitry associated with power monitoring and photo-detection are located on a main board, requiring analog signals to be sent up a flex cable before they are amplified and sampled on the main board. The flex cable typically distorts these analog signals prior to sampling. As shown in FIG. 8, the PMIC 814 and the PDIC 816, each include their own dedicated offset, gain and sample-and-hold (gain/SH) circuits 826 and 828. This enables the PMIC 814 to amplify and sample the analog monitoring signal produced by photo-detector 834. This also enables the PDIC 816 to amplify and sample the analog information signal produced by photo-detectors 836. Such amplification and sampling on the OPU 806 increases fidelity by enabling much finer and more controlled sampling. Additionally, power consumption is reduced because, after sampling, the signals (driven over the flex 804) are relatively slow (it takes less power to drive a slow signal than to drive a fast signal).

The samples of the information signal produced by the PDIC 816 are sent up the flex 804 to the AFE 810, which performs front end signal processing, such as converting analog data to digital data, and controlling focusing and tracking servo loops. The AFE 810 provides a digital signal to the controller 808, as shown in FIG. 8. The controller 808 may communicate (directly or through one or more interface circuits) with a host computer and a servo controller.

Environmental variations (such as temperature variations) and aging of the laser diodes 830 and 832 may affect the characteristics (e.g., slope efficiency) of the laser diodes 830 and 832. The APC 820 accurately controls the output of the laser diodes 830 and 832 to compensate for changes in the laser diode's characteristics. In accordance with an embodiment of the present invention, the APC 820 includes its own dedicated offset, gain, sample-and-hold and loop compensation circuitry (not shown).

The ROPC 822 monitors signals produced by the PDIC 816 in order to purposely modify the power of laser diodes 830 and/or 832 to compensate for changes/contamination in the media (e.g., due to fingerprints and the like). In other words, if the light going to the media reflects back differently than expected, the ROPC 822 adjusts the power to compensate for the changes in the media (rather than keeping the power constant). ROPC 822 can accomplish this using its own offset, gain, sample-and-hold and loop compensation circuitry (not shown).

In summary, PD devices having dynamically configurable PD patterns according to the present invention have a number of significant advantages, including, but not limited to:

i) ability to integrate multiple PDICs previously required to process multiple wavelengths (e.g. different media types) into a single IC;

ii) ability to optimize the PD pattern for each media type;

iii) optimization of PD pattern can be performed by users directly through serial interface in PDIC or PMIC normal operation, or by using control pins;

iv) improved signal to noise ratio (SNR) with optimized PD size/patterns;

v) greater optics design flexibility;

vi) improved bandwidth, particularly advantageous for high speed Blu-ray media, and vii) improved PMIC sensitivity since larger beam spot may be used to relax optical alignment and accompanying lower power density. Users can configure the PMIC to combine multiple (e.g. all) PD segments to form a larger area detector to increase device sensitivity.

As described above, the present invention can be applied to implement a portion of or an entire optical pickup unit with dynamically optimizable PDs for multiple wavelength applications, including conventional CD, DVD and Blu-ray discs and/or HD-DVD format discs, with single or multiple layer formats and related complete information recording/reproducing apparatus. The present invention may also be applied to generic optical storage technologies or other applications that incorporate similar photo sensing techniques.

Although photodetectors herein have been described using photodiodes operating in photovoltaic mode, the invention may also be practiced with photodiodes which operate in photoconductive mode since either photovoltaic or photoconductive mode outputs are adapted to be coupled to conventional amplifier arrangements. However, more generally, those having ordinary skill in the art will realize that photodetectors according to the present invention can comprise other photodetector types.

In the preceding description, certain details are set forth in conjunction with the described embodiment of the present invention to provide a sufficient understanding of the invention. One skilled in the art will appreciate, however, that the invention may be practiced without these particular details. Furthermore one skilled in the art will appreciate that the example embodiments described above do not limit the scope of the present invention. and will also understand that various modifications, equivalents, and combinations of the disclosed embodiments and components of such embodiments are within the scope of the present invention. Embodiments including fewer than all the components of any of the respective described embodiments may also within the scope of the present invention although not expressly described in detail. Finally, the operation of well known components and/or processes has not been shown or described in detail below to avoid unnecessarily obscuring the present invention.

One skilled in the art will understood that even though various embodiments and advantages of the present Invention have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate may be realized through software executing on suitable processing circuitry. The present invention is to be limited only by the appended claims.

What is claimed is:

1. A photodetector integrated circuit (PDIC) capable of being used with at least two different types of optical discs, comprising:
   a photodetector (PD) array including a center channel PD and a side channel PD electrically isolated from said center channel PD; and
   a switching matrix that includes a plurality of inputs and a plurality of outputs, and that can be selectively configured in a plurality of different switch configurations;
   wherein said side channel PD comprises a plurality of electrically isolated PD sections;
   wherein each of said electrically isolated PD sections of said side channel PD is adapted to detect light and provide an electrical output signal, indicative of the light detected by the PD section, to a different one of the inputs of said switching matrix; and
   wherein said switch matrix is adapted to combine the electrical output signals provided by said electrically isolated PD sections of said side channel PD in a plurality of different manners, in dependence on which of the plurality of different switch configurations is selected.

2. The PDIC of claim 1, wherein:
   said center channel PD is adapted to detect light and provide an electrical output signal, indicative of the light detected by said center channel PD; and
   wherein the electrical output signal provided by said center channel PD is used to read data from the optical disc with which the PDIC is being used; and
   wherein the electrical output signals provided by said electrically isolated PD sections of said side channel PD, as combined in the manner that corresponds to the type of disc with which the PDIC is being used, are used for tracking the optical disc with which the PDIC is being used.

3. The PDIC of claim 1, further comprising a controller and/or decoder configured to:
   receive an indication of the type of disc with which the PDIC is being used; and
   select a specific one of the plurality of different switch configurations of the switching matrix, based on the received indication, so that the electrical output signals provided by said electrically isolated PD sections of said side channel PD are combined in a manner that corresponds to the type of disc with which the PDIC is being used.

4. The PDIC of claim 3, wherein the at least two different types of optical discs include at least two of the following types of optical discs:
   a compact disc (CD) type optical disc;
   a digital video disc (DVD) type optical disc; and
   a blu-ray disc (BD) type optical disc.

5. The PDIC of claim 1, wherein:
   the plurality of electrically isolated PD sections of the side channel comprises at least four electrically isolated PD sections.

6. The PDIC of claim 1, wherein:
   the PDIC can be used with a plurality of different wavelengths of light, with each of the different wavelengths of light corresponding to a different one of the at least two different types of optical discs with which the PDIC can be used;
   each wavelength of light, when used, results in a center beam that is incident on the center channel PD and a side beam that is incident on the side channel PD; and
   said switching matrix is adapted to combine the electrical output signals provided by said electrically isolated PD sections so that the side beam that is incident on the side channel PD is effectively centered on the side channel PD regardless of which one of the plurality of different wavelengths of light is being used.

7. The PDIC of claim 1, wherein the at least two different types of optical discs include at least two of the following types of optical discs:
   a compact disc (CD) type optical disc;
   a digital video disc (DVD) type optical disc; and
   a blu-ray disc (BD) type optical disc.

8. A method for use with photodetector integrated circuit (PDIC) capable of being used with at least two different types of optical discs, wherein the PDIC includes a photodetector (PD) array including a center channel PD and a side channel PD electrically isolated from the center channel PD, and wherein the side channel PD includes a plurality of electrically isolated PD sections, the method comprising:

using each of the electrically isolated PD sections of the side channel PD to detect light incident on the PD section and provide an electrical output signal indicative of the light detected by the PD section;

combining the electrical output signals provided by the electrically isolated PD sections of the side channel PD in one of a plurality of different manners, in dependence on which type of optical disc the PDIC is being used with.

9. The method of claim 8, further comprising:

using the center channel PD to detect light and provide an electrical output signal, indicative of the light detected by the center channel PD;

using the electrical output signal provided by the center channel PD to read data from the optical disc with which the PDIC is being used; and using the electrical output signals provided by the electrically isolated PD sections of the side channel PD, as combined in the manner that corresponds to the type of disc with which the PDIC is being used, for tracking the optical disc with which the PDIC is being used.

10. The method of claim 8, further comprising:

receiving an indication of the type of disc with which the PDIC is being used; and combining the electrical output signals provided by the electrically isolated PD sections of the side channel PD in a manner that corresponds to the type of disc specified in the received indication of the type of disc with which the PDIC is being used.

11. The method of claim 10, wherein the at least two different types of optical discs include at least two of the following types of optical discs:

a compact disc (CD) type optical disc;
a digital video disc (DVD) type optical disc; and
a blu-ray disc (BD) type optical disc.

12. The method of claim 8, wherein the at least two different types of optical discs include at least two of the following types of optical discs:

a compact disc (CD) type optical disc;
a digital video disc (DVD) type optical disc; and
a blu-ray disc (BD) type optical disc.

13. A system, comprising:

a first laser diode adapted to be used to read data from a first type of optical disc;

a second laser diode adapted to be used to read data from a second type of optical disc;

a laser driver integrated circuit (LDIC) adapted to selectively drive the first laser diode and the second laser diode; and a photodetector integrated circuit (PDIC) capable of being used with both the first and second types of optical discs;

wherein the PDIC comprises a photodetector (PD) array including a center channel PD and a side channel PD electrically isolated from said center channel PD;

wherein the PDIC also comprises a switching matrix that includes a plurality of inputs and a plurality of outputs, and that can be selectively configured in a plurality of different switch configurations;

wherein said side channel PD comprises a plurality of electrically isolated PD sections;

wherein each of said electrically isolated PD sections of said side channel PD is adapted to detect light and provide an electrical output signal, indicative of the light detected by the PD section, to a different one of the inputs of said switching matrix; and wherein said switching matrix is adapted to combine the electrical output signals provided by said electrically isolated PD sections of said side channel PD in a plurality of different manners, in dependence on which of the plurality of different switch configurations is selected.

14. The system of claim 13, wherein:

said center channel PD is adapted to detect light and provide an electrical output signal, indicative of the light detected by the center channel PD;

the electrical output signal provided by said center channel PD is used to read data from the optical disc with which the system is being used; and the electrical output signals provided by said electrically isolated PD sections of said side channel PD, as combined in the manner that corresponds to the type of disc with which the system is being used, are used for tracking the optical disc with which the system is being used.

15. The system of claim 14, wherein the at least two different types of optical discs include at least two of the following types of optical discs:

a compact disc (CD) type optical disc;
a digital video disc (DVD) type optical disc; and
a blu-ray disc (BD) type optical disc.

16. The system of claim 13, further comprising a controller and/or decoder configured to:

receive an indication of the type of disc with which the PDIC is being used; and select a specific one of the plurality of different switch configurations, based on the received indication, so that the electrical output signals provided by said electrically isolated PD sections of said side channel PD are combined in a manner that corresponds to the type of disc with which the system is being used.

17. The system of claim 13, wherein:

the plurality of electrically isolated PD sections of the side channel comprises at least four electrically isolated PD sections.

18. The system of claim 13, wherein:

the first laser diode produces light having a first wavelength used to read data from the first type of disc;

the second laser diode produces light having a second wavelength used to read data from the second type of disc;

use of either of the first and second laser diodes results in a center beam that is incident on the center channel PD and a side beam that is incident on the side channel PD; and said switching matrix is adapted to combine the electrical output signals provided by said electrically isolated PD sections so that the side beam that is incident on the side channel PD is effectively centered on the side channel PD regardless of whether the first or second laser diodes is being used to read data.

19. The system of claim 13, wherein the at least two different types of optical discs include at least two of the following types of optical discs:

a compact disc (CD) type optical disc;
a digital video disc (DVD) type optical disc; and
a blu-ray disc (BD) type optical disc.

* * * * *